(12) United States Patent
Warren, Jr. et al.

(10) Patent No.: US 7,810,281 B2
(45) Date of Patent: Oct. 12, 2010

(54) ELECTRIC MOTOR DRIVE SYSTEM ASSEMBLY WITH VIBRATION DAMPENING

(75) Inventors: Robert Bruce Warren, Jr., Lawrenceville, GA (US); Luis Acosta, Gainesville, GA (US); Yakov Fleytman, Sunnyvale, CA (US); Martin Schlechtriemen, Oberhaid (DE); Joachim Muller, Werneck (DE); Michael Salzmann, Kronach (DE); Frank Spitzenfeil, Michelau (DE)

(73) Assignee: Brose Fahrzeugteile GmbH & Co. Kommanditgesellschaft, Würzburg, Würzburg (DE)

( * ) Notice: Subject to any disclaimer, the term of this patent is extended or adjusted under 35 U.S.C. 154(b) by 64 days.

(21) Appl. No.: 12/222,935

(22) Filed: Aug. 20, 2008

(65) Prior Publication Data
US 2009/0077896 A1 Mar. 26, 2009

Related U.S. Application Data

(60) Provisional application No. 60/960,251, filed on Sep. 24, 2007.

(51) Int. Cl.
*E05F 15/16* (2006.01)
(52) U.S. Cl. .............................. 49/349; 188/379; 49/506
(58) Field of Classification Search ................... 49/348, 49/349, 506; 188/378, 379; 248/562, 560, 248/567, 568, 570, 636
See application file for complete search history.

(56) References Cited

U.S. PATENT DOCUMENTS

| 2,111,168 | A | * | 3/1938 | Chansor | .................... 200/83 N |
| 3,741,024 | A | | 6/1973 | Bouthors et al. | |
| 4,696,848 | A | * | 9/1987 | Jones et al. | .................... 428/80 |
| 4,865,791 | A | * | 9/1989 | Ferro et al. | .................. 264/134 |
| 5,111,620 | A | * | 5/1992 | Lau et al. | ...................... 49/502 |
| 5,298,694 | A | * | 3/1994 | Thompson et al. | .......... 181/286 |
| 5,560,967 | A | * | 10/1996 | Isaksen | ......................... 428/71 |
| 5,773,375 | A | * | 6/1998 | Swan et al. | ................. 442/340 |
| RE36,323 | E | * | 10/1999 | Thompson et al. | .......... 181/286 |
| 5,961,904 | A | * | 10/1999 | Swan et al. | ................. 264/103 |
| 6,898,901 | B2 | * | 5/2005 | Petroski et al. | ............... 49/502 |

FOREIGN PATENT DOCUMENTS

| DE | 2154669 C3 | 5/1972 |
| DE | 8206823 U1 | 9/1982 |

* cited by examiner

*Primary Examiner*—Jerry Redman
(74) *Attorney, Agent, or Firm*—Manelli Denison & Selter PLLC; Edward J. Stemberger

(57) ABSTRACT

A window lift system includes a motor drive assembly (10) constructed and arranged to control movement window glass of a vehicle, and a door module (35) to which the drive assembly is coupled. The door module has surface features (36) disrupting a surface (37) of the door module to reduce the transfer of vibration energy from the door module to the drive assembly or vise versa. In an embodiment, the door module includes a diaphragm (34) and the surface features are annular, undulating, wave-like features in the diaphragm.

12 Claims, 3 Drawing Sheets

ELECTRIC MOTOR DRIVE SYSTEM ASSEMBLY WITH VIBRATION DAMPENING

This application claims the benefit of the earlier filing date of U.S. Provisional Application No. 60/960,251, filed on Sep. 24, 2007, which is hereby incorporated by reference into this specification.

FIELD OF THE INVENTION

The present invention relates window lift drives for raising and lower a window in a vehicle and, more particularly, to a reducing vibration of an electric motor drive system for moving the window.

BACKGROUND OF THE INVENTION

A door module assembly of a vehicle is subjected to an aggressive vibration pattern to find any potential Noise, Vibration, or Harshness (NVH) and Buzz, Squeak, or Rattle (BSR) issues. The door module assemblies and their components should have no customer dissatisfying NVH issue or BSR issues through the design life of a vehicle which is 10 years or 150,000 miles.

All door module assembles must satisfy the requirements for vehicle shaker testing and ride and drive testing as defined by the platform vehicle functional objectives. Finally, the window glass of the module assembly must not move more than ±/−1.0 mm from the initial positions.

It has been found that in testing conventional door module assemblies, the window glass moved more than ±/−1.0 mm from the initial position. The motor housing of the window-lift motor has a large amplitude of vibration and produces relative motion of a shaft with respect to a worm gear. This relative motion between the shaft and the gear unlocks the shaft and allows the glass to move downwardly.

There are also issues with acoustics or vibration behavior generated by the drive or window lift motor of conventional door module assemblies and transferred to the door module.

Thus, there is a need to provide a door module assembly that substantially prevents the relative motion between the shaft and gear of the drive assembly so that the window is maintained in a desired position and/or reduces the transfer of noise or vibration from the drive assembly to the door module to improve system acoustics.

SUMMARY OF THE INVENTION

An object of the invention is to fulfill the need referred to above. In accordance with the principles of the present invention, this objective is obtained by providing a window lift system including a motor drive assembly constructed and arranged to control movement of window glass of a vehicle. A door module is provided to which the motor drive assembly is coupled. The door module has surface features disrupting a surface of the door module to at least one of reduce the transfer of vibration energy from the door module to the motor drive assembly or reduce the transfer of vibration energy from the motor drive assembly to the door module.

In accordance with aspect of an embodiment of the invention, a window lift system includes a motor drive assembly constructed and arranged to control movement of window glass of a vehicle and a door module to which the motor drive assembly is coupled. The door module has means for disrupting a surface of the door module to module to at least one of reduce the transfer of vibration energy from the door module to the motor drive assembly or reduce the transfer of vibration energy from the motor drive assembly to the door module.

In accordance with yet another aspect of an embodiment of the invention, a method is provided to reduce transfer of vibration energy from a door module to a motor drive assembly in a vehicle. The method provides a motor drive assembly constructed and arranged to control movement of window glass of a vehicle. The motor drive assembly is mounted to a door module of the vehicle. Surface features are provided in the door module that disrupt a surface of the door module to at least one of reduce the transfer of vibration energy from the door module to the motor drive assembly or reduce the transfer of vibration energy from the motor drive assembly to the door module.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
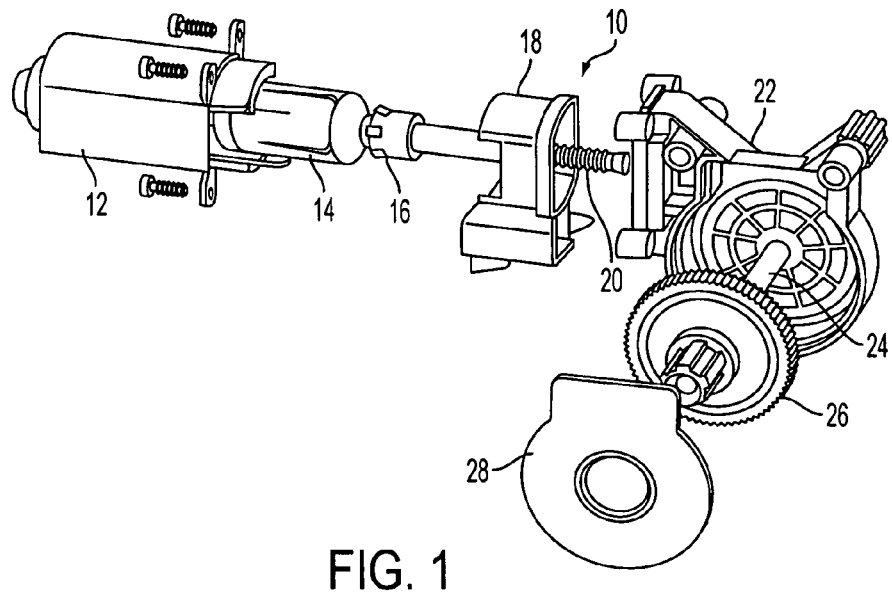
FIG. 1 is an exploded view of a conventional window-lift electric motor drive assembly.

FIG. 1 is an exploded view of a conventional window-lift electric motor drive assembly, generally indicated at 10, for controlling movement of a window (not shown) of a vehicle. The assembly 10 includes a motor housing 12, an armature 14, a commutator 16, a brush card assembly 18, a shaft 20, a gear housing 22, an axle 24, a worm gear 26 constructed and arranged to be engaged with the shaft 20, and a cover 28. The axle 24 is constructed and arranged to be coupled with a window glass (not shown) of a vehicle such that rotation of the shaft 20 moves the worm gear 26 and axle 24 which raises or lowers the window glass.

Figure 2:
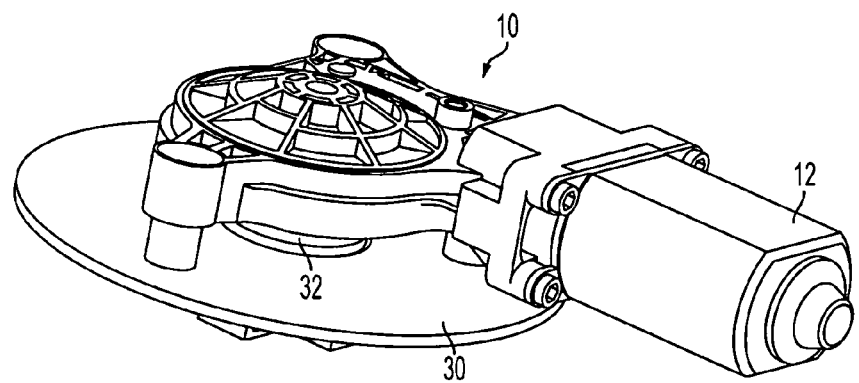
FIG. 2 shows a front view of the motor drive assembly of FIG. 1 shown coupled to a conventional rigid base of a door module.
Figure 3:
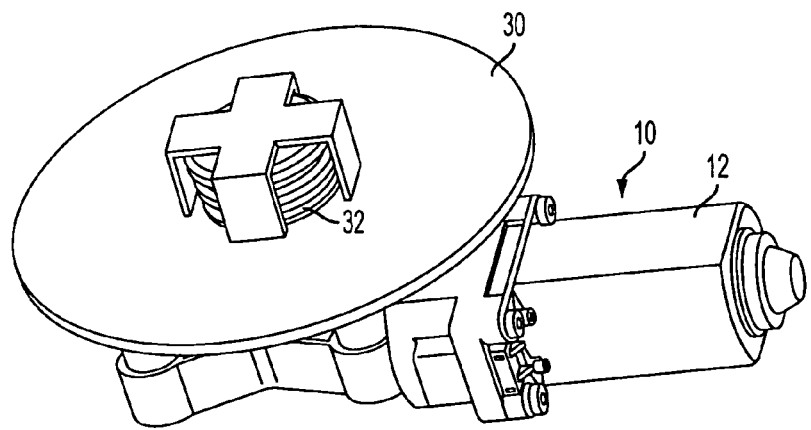
FIG. 3 shows a rear view of the motor drive assembly of FIG. 1 shown coupled to a conventional rigid base of a door module.

FIGS. 2 and 3 show the motor drive assembly 10 coupled to a conventional rigid base 30 of a vehicle door module (not shown). The base 30 can be considered to be part of the door module. All vibration energy from the door module and rigid base 30 is transferred directly to the electric motor gear housing 12 and conventional drum 32 coupled to the rigid base 30. In addition, vibration mechanical energy is transferred to the drum 32 via a drum cable (not shown).

As noted above, the motor housing 12 can experience a large amplitude of vibration and produce relative motion of a shaft 20 with respect to a worm gear 26. This relative motion between the shaft 20 and the gear 26 unlocks the shaft 20 and allows the window glass to move downwardly.

Figure 4:
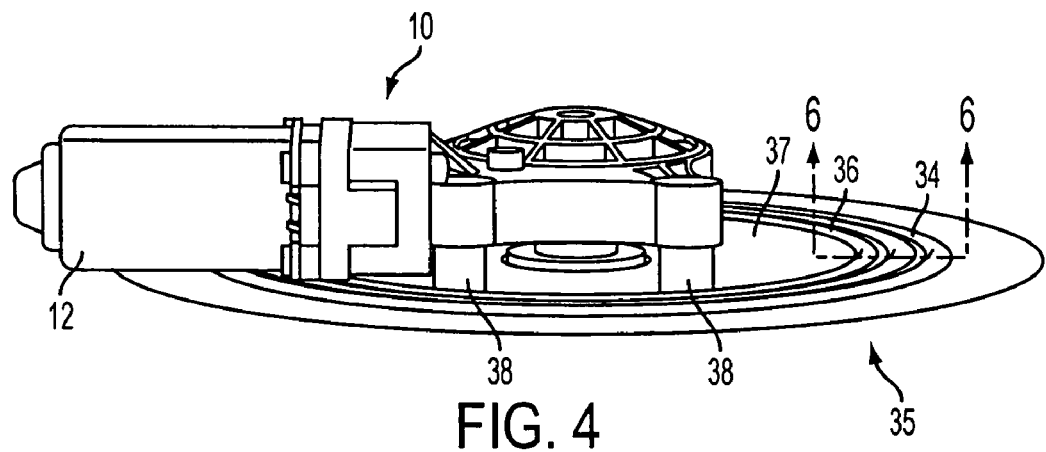
FIG. 4 is a side perspective view of the conventional motor drive assembly of FIG. 1 shown coupled to a diaphragm of the door module in accordance with an embodiment of the invention.
Figure 5:
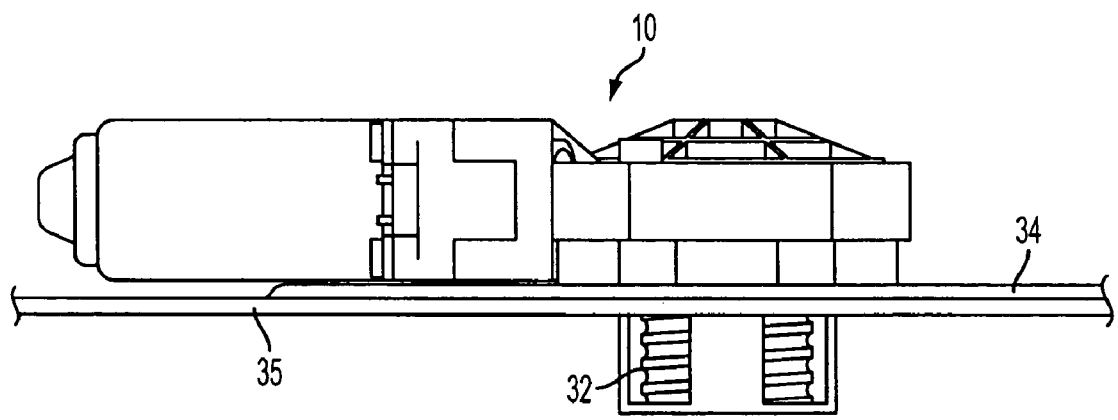
FIG. 5 is a side view of the drive assembly and diaphragm of FIG. 4.

To address the unwanted downward movement of the window glass, in accordance with the principles of an embodiment of the invention and with reference to FIGS. 4 and 5, the motor drive assembly 10 is shown coupled with a door module 35 of a vehicle with the door module including a molded diaphragm 34. The diaphragm 34 can be considered to be integral with the door module 35 and reduces vibration energy that is transferred to the motor drive assembly 10 so as to substantially prevent the window glass (not shown), moved by the motor drive assembly 10, to move due to vibration. Thus, the diaphragm 34 functions as a damper for mechanical energy.

Figure 6:
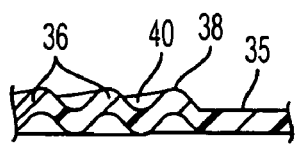
FIG. 6 is a sectional view of the diaphragm taken along the line 6-6 of FIG. 4.

With reference to FIGS. 4 and 6, the diaphragm 34 has a plurality of surface features, preferably in the form of annular, undulating, wave-like features 36, to disrupt a surface 37 of the door module 35 and thus disturb vibration energy. With reference to FIG. 4, the diaphragm 34 surrounds all of the fixing points 38 (e.g. bolts, screws, or other fasteners) that secure the drive assembly 10 to the door module 35. As best shown in FIG. 6, the surface features 36, in section, are generally in the form of a sine-wave defining peaks 38 and valleys 40. The number of peaks and valleys and height and depth thereof can be selected based on the particular application.

Thus, since vibration is dampened by the diaphragm 34, relative motion between the shaft 20 and worm gear 26 is reduce or prevented thus preventing unwanted movement of the window glass. In addition, the diaphragm 34, 34' requires minimum space such that it can be employed without significant modification of conventional structure. Different tuning frequencies are possible for the Y and Z vibration directions.

Figure 7:
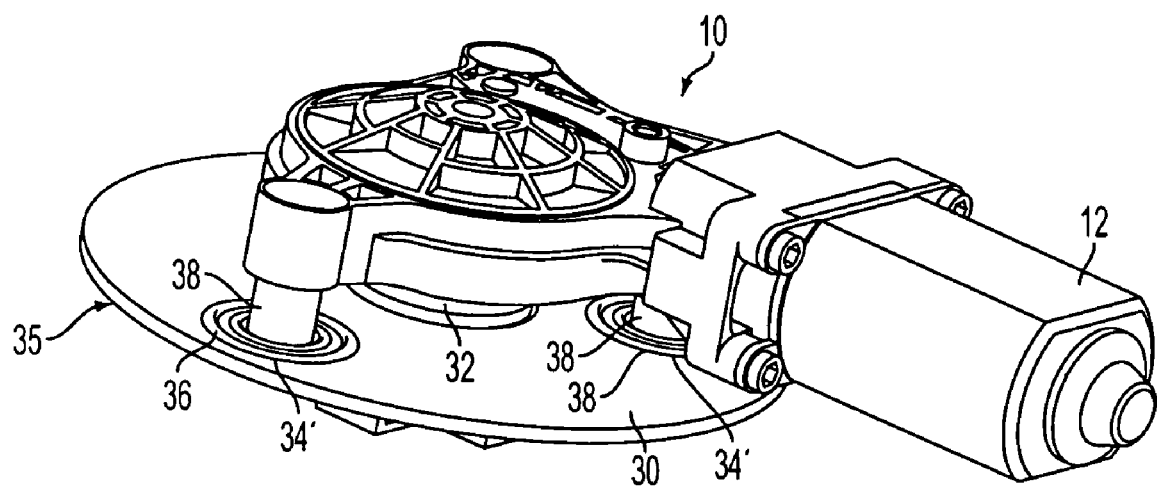
FIG. 7 is a view of another embodiment of diaphragms surrounding the fixing points of a motor drive assembly for a door module.

A main introduction of structure-borne noise or vibration occurs at the fixing points 38 attaching the drive assembly 10 to the door module 35. This noise can cause the surrounding structure to vibrate, which in turn may cause a substantial deterioration of the system acoustics. With reference to FIG. 7, another embodiment of the diaphragm is shown where the diaphragm 34' with surface features 36 is located to surround at least some of the fixing points 38. The diaphragm 34' can be die cast and preferably has a stiffness varying with the spatial direction for decoupling the structure-born noise, generated from the drive assembly 10, from the surrounding structure. In the embodiment of FIG. 7, it is preferable that a separate diaphragm 34' surrounds each fixing point 38 and thus changes stiffness in this area. Alternatively, similar to FIG. 4, a single the diaphragm 34 can surround all of the fixing points 38. The diaphragm 34' can have a combination of different wall thicknesses and materials (e.g., two-component technology) and is preferably for plastic and steel door modules.

Thus, it can be appreciated that the diaphragm 34, 34' reduces the transfer of vibration from the door module 35 to the drive assembly 10 and reduces the transfer of vibration and thus noise from the drive assembly 10 to the surrounding door module 35.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A window lift system comprising:
    a motor drive assembly constructed and arranged to control movement of window glass of a vehicle, and
    a door module to which the motor drive assembly is coupled, the door module having surface features disrupting a surface of the door module to at least one of reduce the transfer of vibration energy from the door module to the motor drive assembly or reduce the transfer of vibration energy from the motor drive assembly to the door module,
    wherein the door module includes a diaphragm, the surface features being annular, undulating features in the diaphragm, and
    wherein the motor drive assembly is secured to the door module at fixing points, and a separate diaphragm surrounds each of the fixing points thereby defining a stiffness at the fixing points that is different from a stiffness of other portions of the door module.

2. The system of claim 1, wherein, in section, the surface features are generally in the form of a sine wave having peaks and valleys.

3. The system of claim 1, wherein the motor drive assembly has a rotatable shaft coupled with a worm gear.

4. The system of claim 3, wherein the worm gear is associated with an axle, the axle being constructed and arranged to cause movement of the window glass.

5. The system of claim 1, wherein the diaphragm is molded integrally with the door module.

6. A window lift system comprising:
    a motor drive assembly constructed and arranged to control movement of window glass of a vehicle, and
    a door module to which the motor drive assembly is coupled, the door module having means for disrupting a surface of the door module to at least one of reduce the transfer of vibration energy from the door module to the motor drive assembly or reduce the transfer of vibration energy from the motor drive assembly to the door module,
    wherein the means for disrupting includes a diaphragm having surface features including undulating features in the form of a sine wave having peaks and valleys in the diaphragm, and
    wherein the motor drive assembly is secured to the door module at fixing points, and a separate diaphragm surrounds each of the fixing points thereby defining a stiffness at the fixing points that is different from a stiffness of other portions of the door module.

7. The system of claim 6, wherein the motor drive assembly has a rotatable shaft coupled with a worm gear.

8. The system of claim 7, wherein the worm gear is associated with an axle, the axle being constructed and arranged to cause movement of the window glass.

9. The system of claim 6, wherein the diaphragm is molded integrally with the door module.

10. A method of reducing transfer of vibration energy from a door module to a motor drive assembly in a vehicle, the method comprising:
    providing a motor drive assembly constructed and arranged to control movement of window glass of a vehicle,
    mounting the motor drive assembly to a door module of the vehicle at fixing points, and providing surface features in the door module that disrupt a surface of the door module to at least one of reduce the transfer of vibration energy from the door module to the motor drive assembly or reduce the transfer of vibration energy from the motor drive assembly to the door module, wherein the step of providing the surface features includes providing at least one diaphragm, the surface features being annular, undulating features in the form of a sine wave having peaks and valleys in the diaphragm, a separate diaphragm surrounds each of the fixing points thereby defining a stiffness at the fixing points that is different from a stiffness of other portions of the door module.

11. The method of claim 10, wherein the step of providing the motor drive assembly includes providing the motor drive assembly to include a rotatable shaft coupled with a worm gear, the worm gear being associated with an axle, the axle being constructed and arranged to cause movement of the window glass.

12. The method of claim 10, wherein the diaphragm is molded integrally with the door module.

* * * * *